United States Patent [19]

Tashiro et al.

[11] Patent Number: 4,812,838
[45] Date of Patent: Mar. 14, 1989

[54] VEHICLE SEAT DRIVE CONTROL DEVICE

[75] Inventors: Syuzaburou Tashiro, Okazaki; Toshikazu Ina, Nagoya; Osamu Nakano; Masahiro Taguchi, both of Aichi; Sadahisa Onimaru, Nishio; Akira Kuno, Oobu, all of Japan

[73] Assignees: Nippondenso Co., Ltd., Nishio; Nippon Soken, Inc., Kariya, both of Japan

[21] Appl. No.: 115,610

[22] Filed: Oct. 30, 1987

Related U.S. Application Data

[63] Continuation of Ser. No. 761,415, Aug. 1, 1985, abandoned.

[30] Foreign Application Priority Data

| Aug. 3, 1984 | [JP] | Japan | 59-162966 |
| Aug. 3, 1984 | [JP] | Japan | 59-162967 |
| Aug. 3, 1984 | [JP] | Japan | 59-162968 |

[51] Int. Cl.$^4$ .............. G05B 19/42; B60K 26/00
[52] U.S. Cl. .............. 340/825.06; 318/568; 364/424.05; 320/13; 297/330; 296/65.1; 180/326
[58] Field of Search .......... 340/825.06; 318/466, 318/568; 364/424; 296/63, 65 R; 297/330, 341; 180/326, 329, 330; 320/13

[56] References Cited

U.S. PATENT DOCUMENTS

| 3,979,657 | 9/1976 | Yorksie | 320/13 |
| 4,045,721 | 8/1977 | Swain | |
| 4,267,494 | 5/1981 | Matsuoka et al. | 180/326 |
| 4,401,928 | 8/1983 | Kamijo et al. | 318/466 |
| 4,451,887 | 5/1984 | Harada et al. | 318/466 |
| 4,456,861 | 6/1984 | Ratzel et al. | 318/568 |
| 4,467,252 | 8/1984 | Takeda et al. | 318/568 |
| 4,477,874 | 10/1984 | Ikuta et al. | 364/424 |
| 4,547,718 | 10/1985 | Ratzel et al. | 318/568 |

FOREIGN PATENT DOCUMENTS

| 52-8123 | 1/1977 | Japan . |
| 54-29446 | 5/1979 | Japan . |
| 54-89220 | 7/1979 | Japan . |
| 58-214423 | 12/1983 | Japan . |
| 59-220803 | 12/1984 | Japan . |
| 59-230838 | 12/1984 | Japan . |

Primary Examiner—Benedict V. Safourek
Assistant Examiner—Ralph E. Smith
Attorney, Agent, or Firm—Cushman, Darby & Cushman

[57] ABSTRACT

A drive control device for a seat in a vehicle has a driver entry detection unit, a battery capacity detection unit, a seat drive unit, and a controlling circuit unit for generating a seat drive control signal. The controlling circuit unit has a function of deciding whether or not the capacity of the battery is lower than a predetermined reference value when an entry is detected by the entry detection unit, a function of prohibiting the driving of the seat when the decision of the battery capacity decision function is affirmative, and a function of effecting the driving of the seat when the decision of the battery capacity decision function is negative. The controlling circuit unit can provide a door opening degree monitoring function and a rear monitoring function.

16 Claims, 14 Drawing Sheets

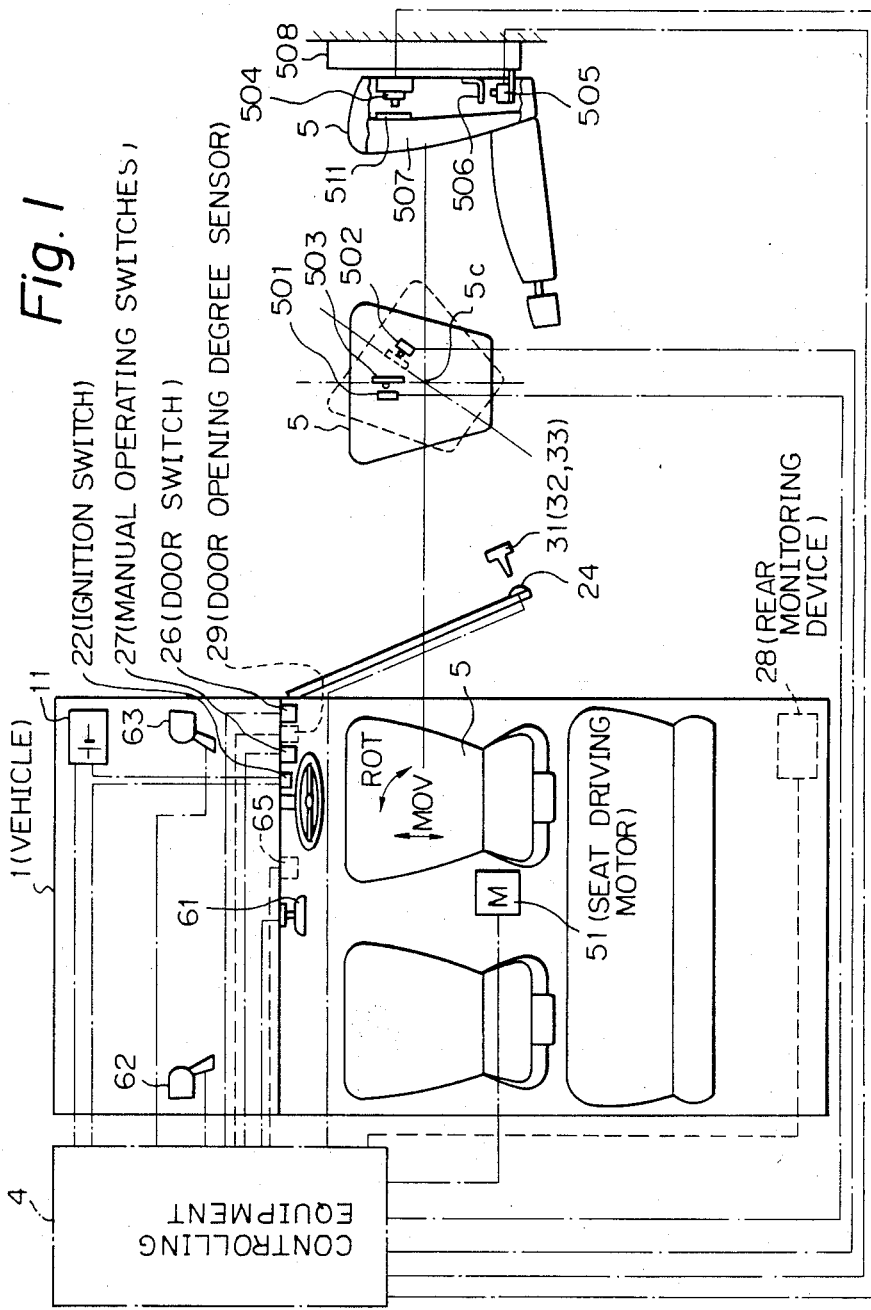

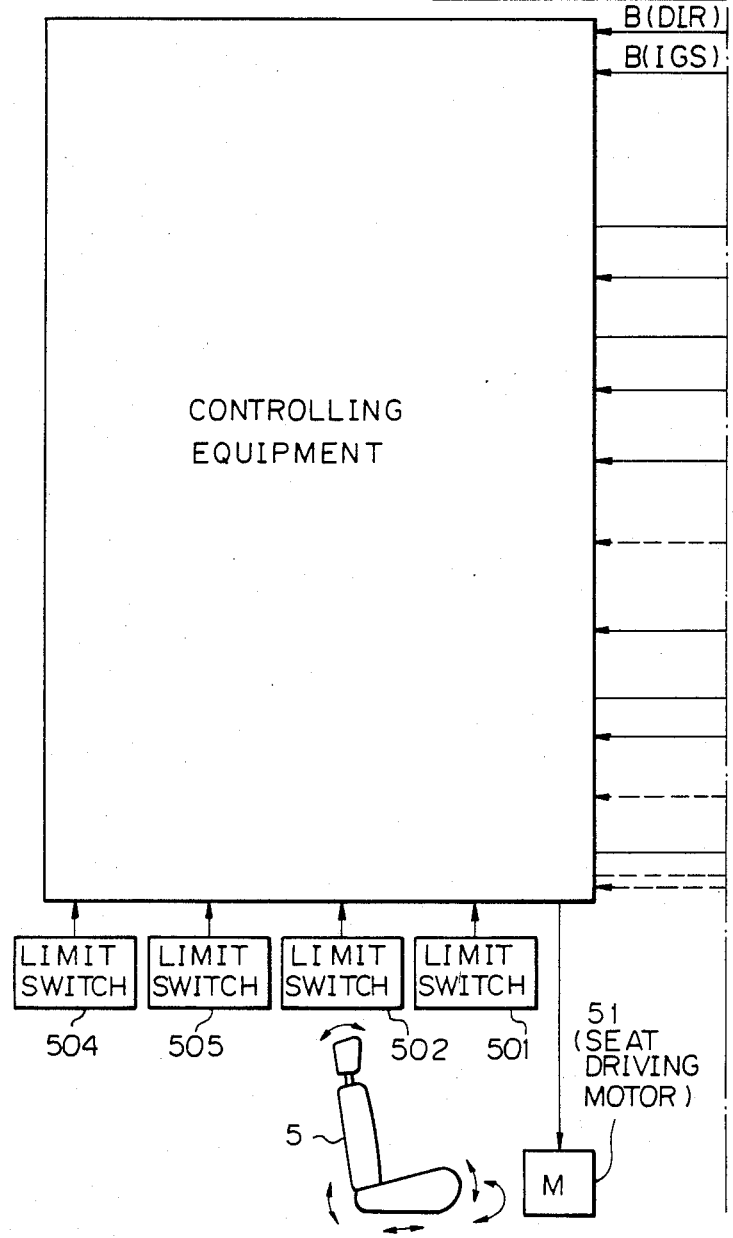

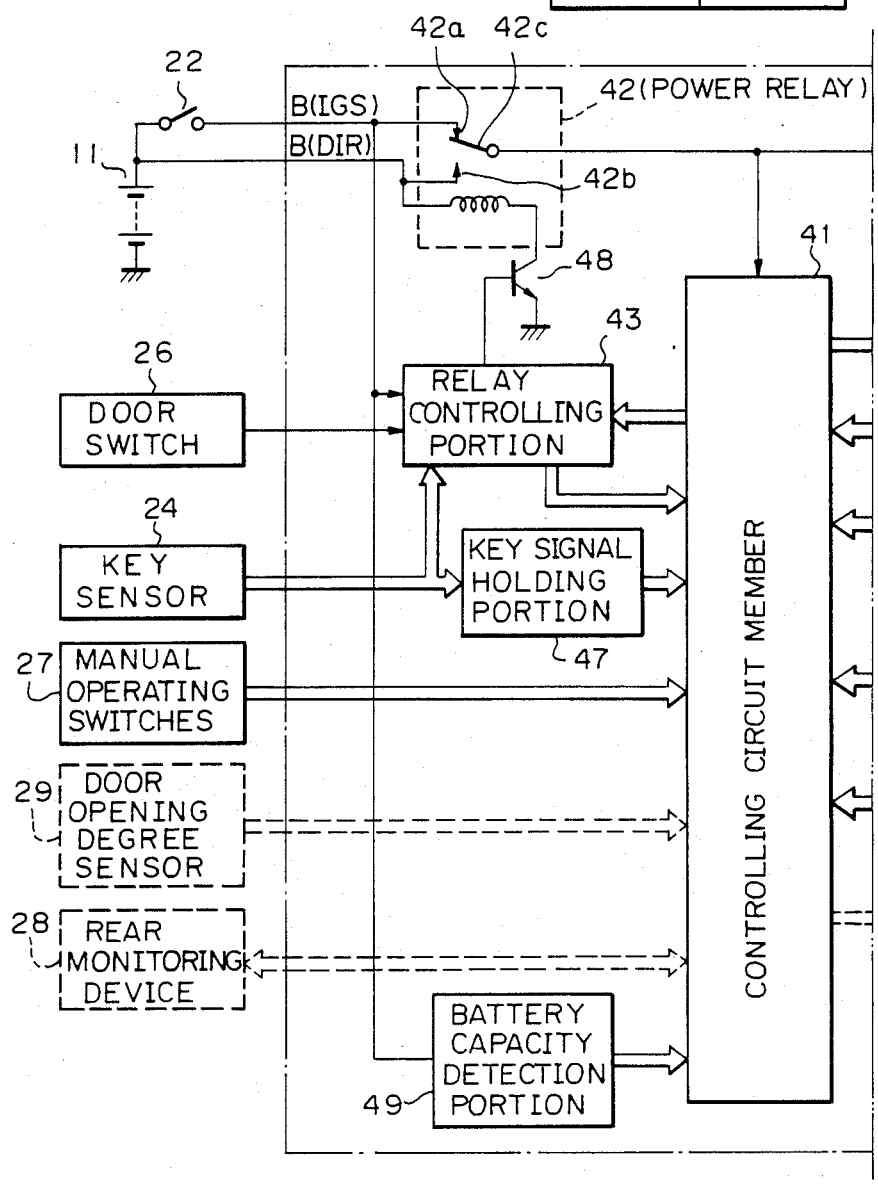

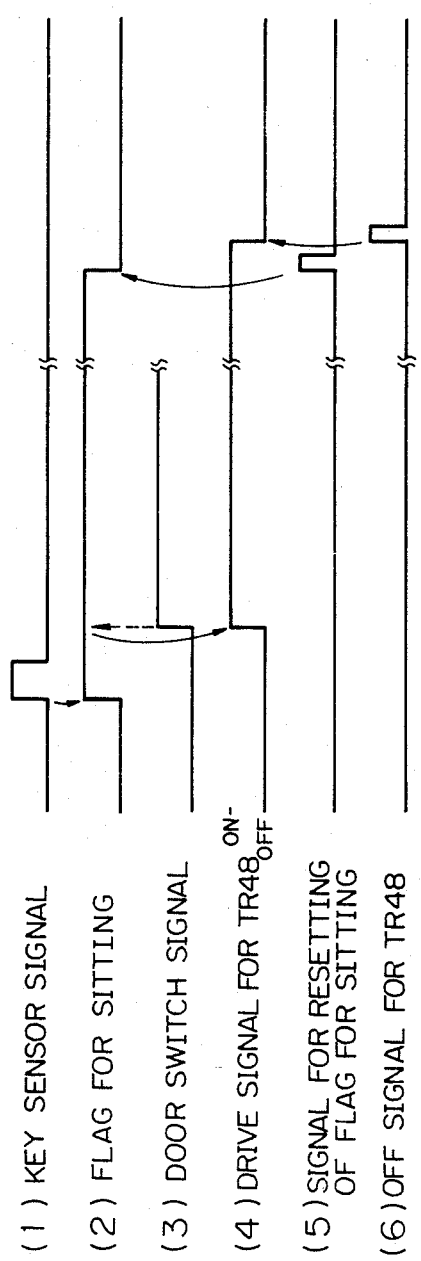

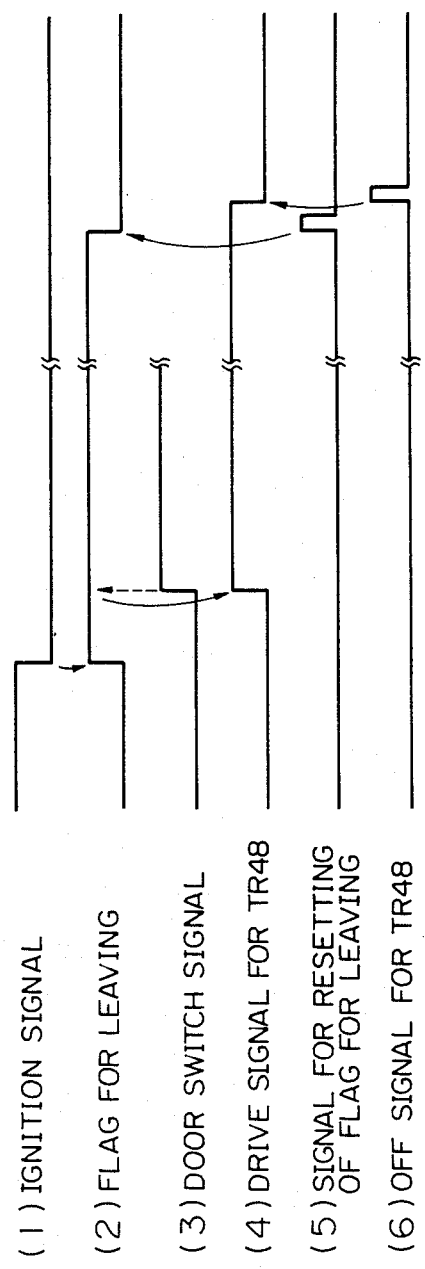

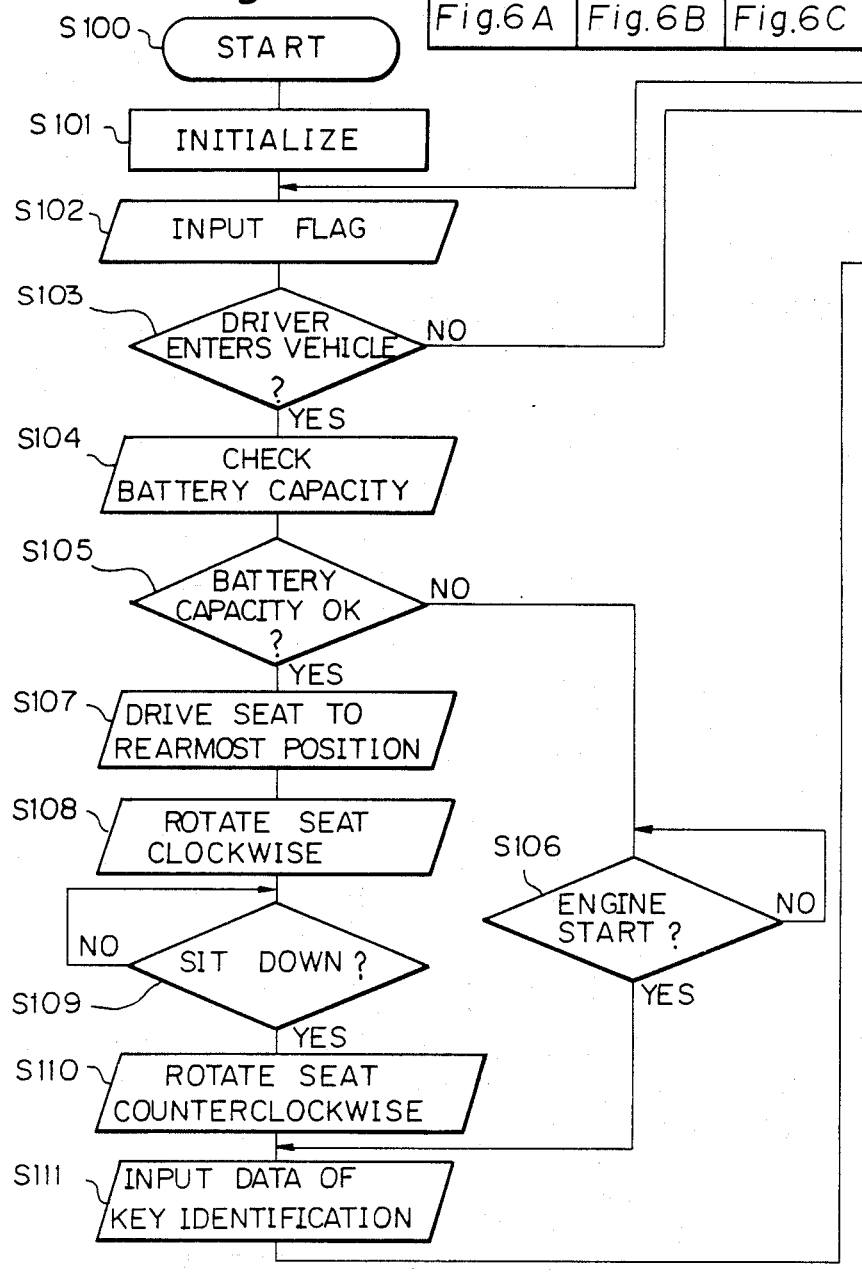

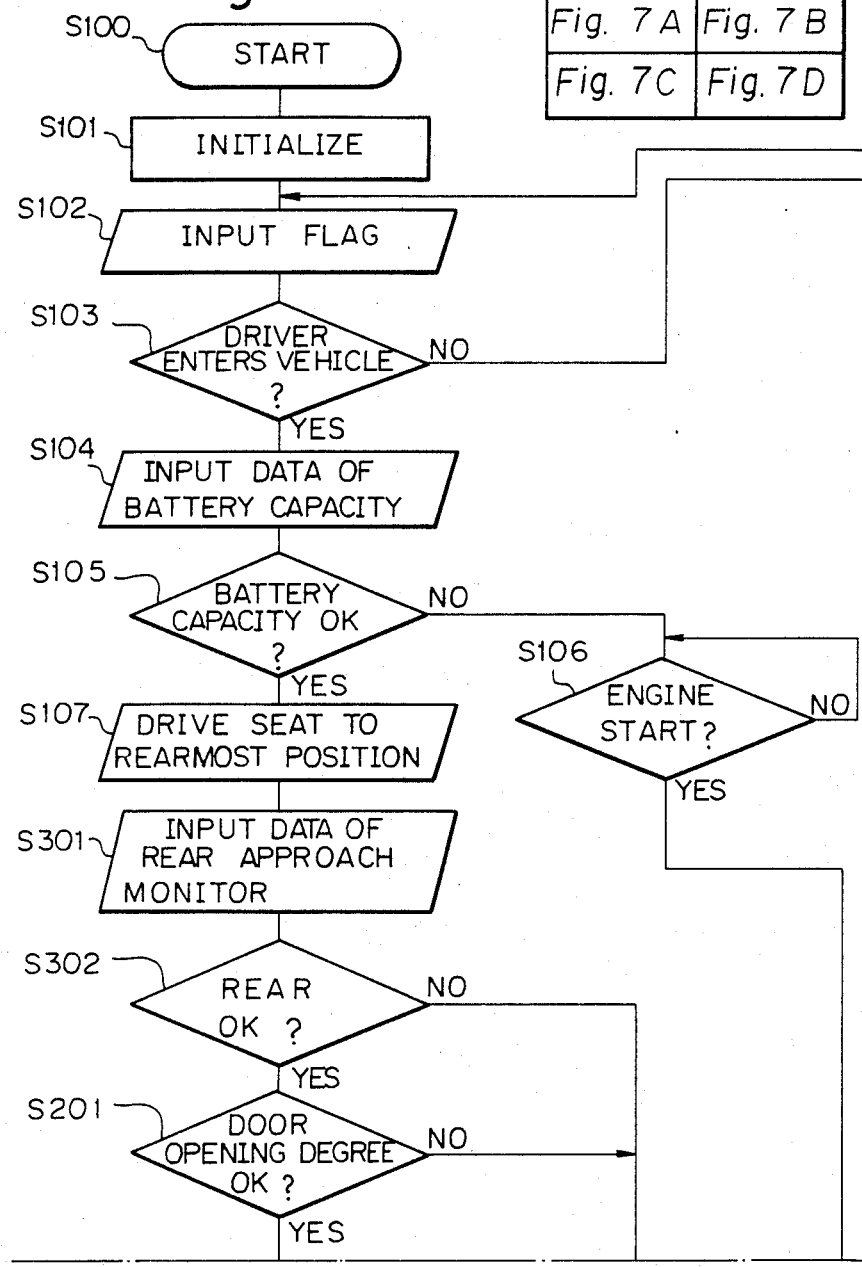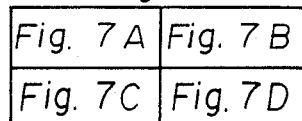

VEHICLE SEAT DRIVE CONTROL DEVICE

This is a continuation of application Ser. No. 761,145, filed Aug. 1, 1985, which was abandoned upon the filing hereof.

BACKGROUND OF THE INVENTION

1. Field of the Invention

The present invention relates to a drive control device and method for a driver's seat in a vehicle. The method and device according to the present invention is used for an automotive vehicle.

2. Description of the Related Art

Conventionally, a drive control device of this type has been proposed wherein a seat or mirrors are activated by a battery mounted in a vehicle and thereby moved to positions at which a driver can easily enter a vehicle upon detection of entry of the driver into the vehicle by a key sensor of a door and a door switch. However, when a capacity of the battery is decreased, since high power is particularly required for moving the seat, the battery is excessively discharged before starting the engine, thus preventing the engine from being started.

When a seat is rotated in a state wherein a door is only partially open, e.g., when the door is almost closed, or when the door is being closed while rotating the seat, the seat may abut against the door, resulting in damage to the seat or the door.

In a state wherein the seat is being rotated to a sitting-down-adaptive position (a position of the seat adapted to allow the driver to easily sit down in the driver's seat), the door cannot be closed. Thus, with regard to passing traffic, e.g., another vehicle approaching from the rear of the vehicle, safe entry to and alighting from the vehicle cannot be assured.

A vehicle door lock control system disclosed in Japanese Unexamined Patent Publication (Kokai) No. 54-29446 and a rotation control apparatus of a vehicle seat disclosed in Japanese Unexamined Patent Publication (Kokai) No. 58-214423 has been proposed prior to the present invention. Also, as prior art to the present invention, for example, Japanese Unexamined Patent Publication (Kokai) Nos. 59-220803, 59-230838 can be referred to.

SUMMARY OF THE INVENTION

In consideration of the above situation, an object of the present invention is to perform proper drive control of a driver's seat without preventing a vehicle engine from being started even when a capacity of a battery is lowered, by monitoring a voltage of the battery with a power source control unit so as to detect a decrease in capacity of the battery, inhibiting a drive operation of the seat and mirrors in a key switch off state when a decrease in battery capacity is detected, and setting the seat and the mirrors at predetermined positions after confirming that a generator for charging the battery is operating.

It is another object of the present invention to prevent a driver's seat from abutting against a door upon rotation of the seat, to allow proper drive control of the driver's seat.

It is still another object of the present invention to allow safe entry to and alighting from a vehicle upon rotation of a seat when traffic hazards exist.

According to a fundamental aspect of the present invention, there is provided a drive control device and method for a seat in a vehicle including: an entry detection unit for detecting an entry of a driver into the vehicle; a battery capacity detection unit for detecting the capacity of an electric power source battery in the vehicle, a seat drive unit for causing the motion of the seat; and a controlling circuit unit for receiving signals from the entry detection unit and the battery capacity detection unit and delivering a drive control signal to the seat drive unit.

The controlling unit has a function of deciding whether or not the capacity of the battery is lower than a predetermined reference value when an entry is detected by the entry detection unit, a function of prohibiting the driving of the seat when the decision of the battery capacity decision function is affirmative, and a function of effecting the driving of the seat when the decision of the battery capacity decision function is negative.

According to another aspect of the present invention, there is provided a drive control device and method for a seat in a vehicle including: an entry detection unit for detecting an entry of a driver into the vehicle; a battery capacity detection unit for detecting the capacity of an electric power source battery in the vehicle; and an engine start detection unit for detecting the start of the rotation of the engine. The drive control device also includes first decision means for deciding whether or not the battery capacity detected by the battery capacity detection unit is lower than a predetermined capacity when an entry of a driver is detected by the entry detection unit; first drive means for driving first the seat to a predetermined setting-down-adaptive state when the decision of the first decision means is negative; second drive means for driving the seat to a preliminarily stored vehicle-driving-adaptive state after the first driving by the first driving means; and second decision means for deciding whether or not the start of the rotation of the engine is detected by the engine start detection unit when the decision of the first decision means is affirmative. The drive control device also includes means for by-passing the first driving means and carrying out directly the driving by the second drive means when the decision of the second decision means is affirmative.

BRIEF DESCRIPTION OF THE DRAWINGS

FIG. 1 is a circuit diagram of a drive control device for a seat in a vehicle according to an embodiment of the present invention;

FIGS. 2A and 2B depict a block diagram of a connection between controlling equipment and peripheral circuits in the device shown in FIG. 1;

FIGS. 3A and 3B depict a block diagram of an arrangement of the controlling equipment shown in FIG. 1;

FIG. 4 is a timing chart of relay control in an entry mode;

FIG. 5 is a timing chart of relay control in a leaving mode;

FIGS. 6A, 6B, and 6C depict a flow chart of an example of an operation of the device shown in FIG. 1; and FIGS. 7A, 7B, 7C, and 7D depict a flow chart of another example of an operation of the device shown in FIG. 1.

Figure 2B:
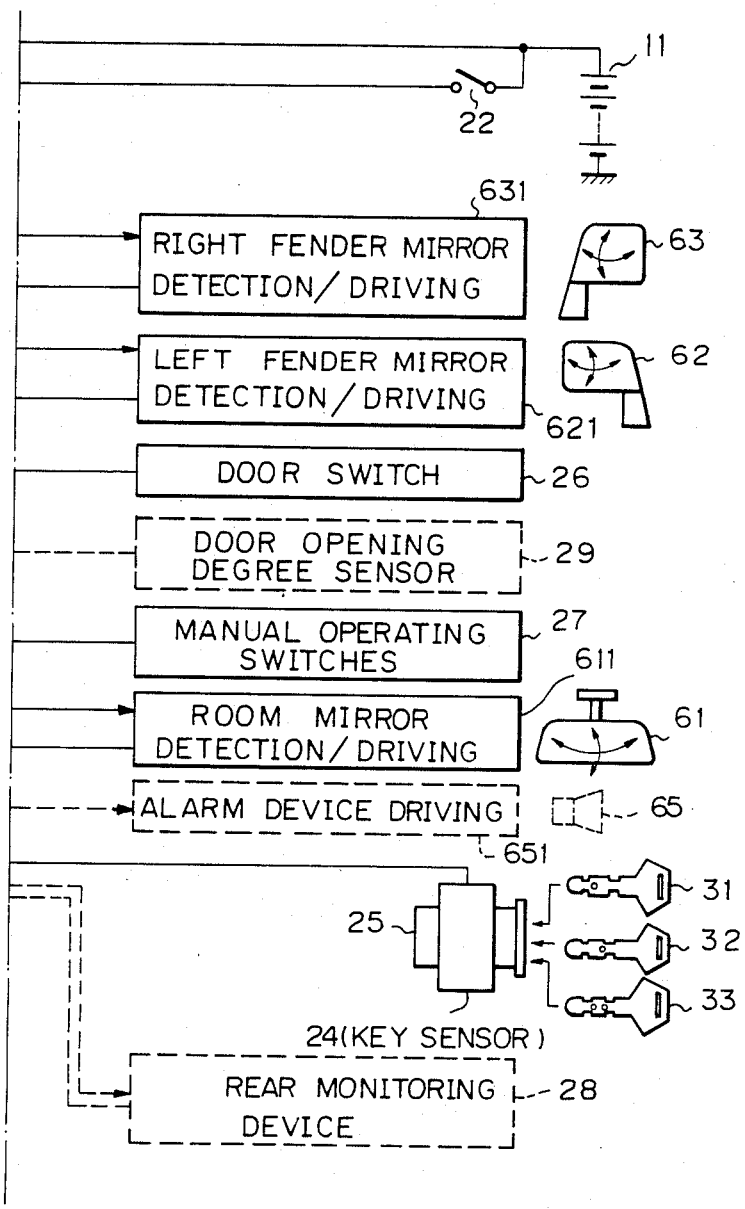

DESCRIPTION OF THE PREFERRED EMBODIMENTS ((Basic Arrangement of Device))

FIG. 1 shows a drive control device for a driver's seat, equipment and the like in a vehicle according to an embodiment of the present invention. Reference numerals denote the following structures 1 denotes a vehicle; 11, a battery provided in the vehicle; 22, an ignition switch; 31, an A key; 32, a B key; 33, a C key; 24, a key sensor; 25, a key cylinder of a door at a driver's seat side (FIGS. 2A and 2B); 26, a door switch which is turned on when a door is open; and 27, manual operating switches for manually aligning the seat and mirrors.

Figure 3B:
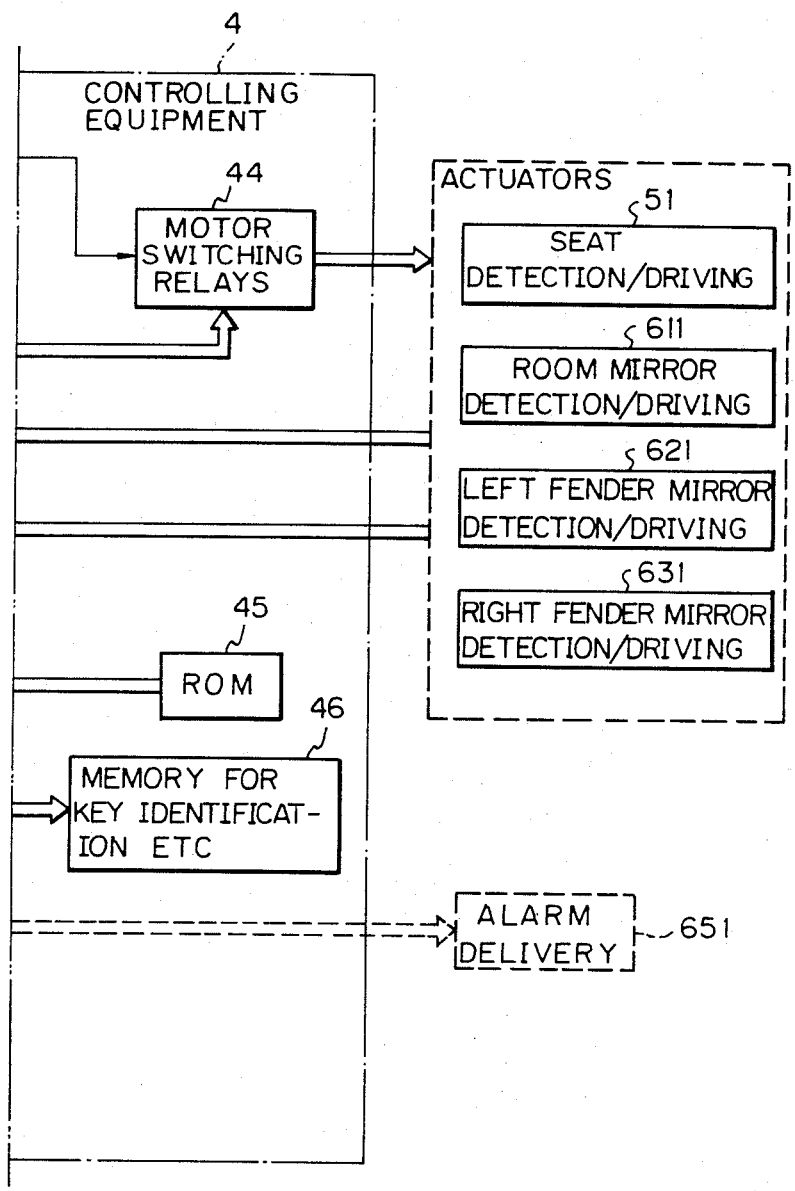

Referring again to FIG. 1, reference numerals denote the following structures 61 denotes a room mirror; 62, a left fender mirror; 63, a right fender mirror; and 4, controlling equipment. In the controlling equipment shown in FIG. 3, reference numeral 41 denotes a controlling circuit, e.g., comprising a microcomputer. Referring to FIGS. 3A and 3B, reference numeral 42 denotes a power relay; 43, a relay controlling portion; 48, a relay driving transistor; 44, motor switching relays; 45, a read-only memory (ROM) for storing a program; and 46, a memory.

Referring again to FIG. 1, reference numerals denote the following structures 5 denotes a driver's seat; 501, a limit switch for detecting a front position of the seat; 502, a limit switch for detecting a clockwise rotation limit (right-full rotation) position of the seat; 5C, a rotating axis; and 503, an actuating plate for actuating the switches 501 and 502. Reference numeral 504 denotes a switch for detecting that the driver is seated in the seat. When a driver is seated in the seat, the seat cushion is compressed downward and the switch 504 is actuated by an actuating plate 511.

A limit switch 505 is fixed to a base 508 and detects a limit position when the seat is moved forward or backward. The base 508 is fixed to the vehicle body. Reference numeral 506 denotes an actuating plate which is fixed to the seat for actuating the switch 505. The seat is movable forward and backward and is pivotal with respect to the base 508. Referring to FIGS. 3A and 3B; reference numeral 47 denotes a key signal holding portion; and 49, a battery capacity detection portion.

With the arrangement shown in FIG. 1, and as shown in FIGS. 3A and 3B, a power source voltage B(DIR) directly from the battery 11 and a power source voltage B(IGS) from the battery 11 via the ignition switch 22 are supplied to the controlling equipment 4. Because a seat slide position and the like for each driver is preset and the seat is automatically moved to the preset position when that driver is to drive the vehicle, a key serves as a driver discrimination means. Reference numerals 31, 32, and 33 denote keys having holes, in which the number of holes and their positions are varied. Holes are formed in the key cylinder so that the central axis of the hole of a key coincides with that of the key cylinder when the key is inserted in the key cylinder 25 of the door at the driver's seat side and is rotated in a lock release direction. The key sensor 24 comprises two pairs of light emitting diodes and phototransistors which are arranged on optical axes between the holes of the key and that of the key cylinder. The door switch 26 is turned on when the door is open.

The driver's seat 5 is driven by a motor 51 in five modes, i.e., a back and forth sliding mode, a vertical moving mode of a front edge of the seat, a vertical moving mode of a rear edge of the seat, a back and forth reclining mode, and a clockwise or counterclockwise rotating mode in the horizontal plane (indicated by arrows in FIGS. 2A and 2B). Each mirror surface of the room mirror 61 and the left and right fender mirrors 62 and 63 can be driven by motors in detection/driving portions 611, 621, and 631 in horizontal and vertical moving modes (indicated by arrows in FIGS. 2A and 2B). The manual operating switches 27 are used by the driver to adjust the seat and the mirrors to their optimum positions.

In the device shown in FIGS. 3A and 3B, the controlling circuit member 41 is operated in accordance with the program stored in a ROM. The relay controlling portion 43 controls the power relay 42 in accordance with signals from the door switch 26 and the key sensor 24 and the power source voltage B(IGS).

In the device shown in FIG. 1, a door opening degree sensor 29 and an alarm device 65 can be provided. The door opening sensor 29 is provided at the rotation center of the door, and is constituted by a plurality of contacts which are open/closed in accordance with the door opening degree. Therefore, the door switch 26 and the door opening sensor 29 can be commonly used. The alarm device 65 is driven by an alarm device driving portion 651 in response to an instruction from the controlling equipment 4, thus producing an alarm sound.

In the device shown in FIG. 1, a rear monitoring device 28 can be provided. The same rear monitoring device of a radio wave type as described in "Door Look Control Method and Apparatus thereof" in Japanese Unexamined Patent Publication (Kokai) No. 54-29446 can be used. The rear monitoring device 28 is operated in response to an instruction from the controlling equipment 4, detects whether or not a vehicle is approaching from the rear of the vehicle, and supplies the detection result to the controlling equipment 4.

((Relay Control For Entry and Leaving Modes))

Relay control for the entry mode will be described with reference to a timing chart of FIG. 4. In FIG. 4, (1) the signal of the key sensor, (2) the flag for sitting, (3) the signal of the door switch, (4) the drive signal for the transistor 48, (5) the signal for resetting of the flag for sitting, and (6) the off signal for the transistor 48 are shown. When the key is inserted in the key cylinder for entry to the vehicle and is rotated to the lock release side, the key sensor 24 detects the holes of the key and generates a signal. In synchronism with the rising of this key sensor signal, a flag for entry is set in the relay controlling portion 43. When the door is opened, the door switch 26 is turned on, and a drive signal of the transistor 48 is set, since the AND condition between the rising of the door switch signal and the entry flag is established. The transistor 48 is turned ON, the relay 42 is turned ON, and a switching contact 42c is connected to a terminal 42b. Power is supplied to the controlling circuit member 41, and the controlling circuit member 41 is operated.

In the operation of the controlling circuit member 41, it is then determined that the driver has entered the vehicle, and the entry mode control is performed. After automatically moving the seat and mirrors to preset positions (to be described later), the entry flag in the relay controlling portion 43 is reset, and the drive signal of the transistor 48 is reset. The transistor 48 is turned OFF, the relay 42 is turned OFF, and the switching contact 42c is connected to a terminal 42a. At this time, if the ignition switch 22 is closed, the controlling circuit member 41 continues to operate; otherwise, the controlling circuit member 41 stops operating.

Relay control for the leaving mode will be described with reference to a timing chart of FIG. 5. In FIG. 5, (1) the signal of the ignition, (2) the flag for leaving, (3) the signal of the door switch, (4) the drive signal for the transistor 48, (5) the signal for resetting of the flag for leaving, and (6) the off signal for the transistor 48 are shown. When the ignition switch 22 is opened by a driver leaving the vehicle, the ignition signal falls. In response to this falling of the ignition signal, a flag for leaving in the relay controlling portion 43 is set. Since the door switch 26 is turned ON and the AND condition between the rising of the door switch signal and the leaving flag is established, the drive signal of the transistor 48 is set. The transistor 48 is turned ON, the relay 42 is turned ON, and the switching contact 42c is connected to the terminal 42b. Power is supplied to the controlling circuit member 41 and the member 41 is operated.

In the operation of the controlling circuit member 41, the flag set in the relay controlling portion 43 is read, it is detected that the driver is leaving the vehicle, and the leaving mode control is performed. After the seat is rotated counterclockwise to its original position, the leaving flag set in the relay controlling portion 43 is reset, and the drive signal of the transistor 48 is reset. The transistor 48 is turned OFF, the relay 42 is turned OFF, and the switching contact 42c is connected to the terminal 42a. At this time, since the ignition switch 22 is open, the controlling circuit member 41 stops operating.

((Detection of Battery Capacity))

The operation of the battery capacity detection portion 49 will be described hereinafter. The battery capacity detection portion 49 is an important component of the device shown in FIG. 1. When the battery capacity is lowered, if the seat 5 and the like are moved before starting the engine and power is consumed, the battery capacity is further lowered, and the engine cannot be started. Thus, a decrease in battery capacity is detected by the battery capacity detection portion 49, and the detection result is supplied to the controlling circuit member 41. When the battery capacity is lowered, the driving operation of the seat before starting the engine is inhibited.

More specifically, in order to detect a decrease in the battery capacity, since a lead accumulator is used as a battery in this embodiment, a method for measuring a specific gravity of an electrolytic solution is adopted. For example, Japanese Unexamined Utility Model Publication No. 52-8123 describes apparatus for detecting an abnormality in a storage battery. The apparatus has a float adapted to move in accordance with changes of the specific gravity and the level of liquid to be measured. A housing is also included for supporting the float. The invention is characterized in that a bubble baffle plate having a diameter equal to or greater than the diameter of the float is provided at an end of the housing. Thus, the float will not be affected by the bubbles generated from the electrode plate of the storage battery. Alternatively, in order to detect the battery capacity, a method for measuring a voltage drop when a large amount of power is instantaneously consumed can be adopted. For example, Japanese Unexamined Patent Publication 54-89220 discloses a vehicle-mounted battery checking apparatus. In this Japanese document, it is described that voltage detection circuitry monitors the terminal voltage of the battery and compares it with a preset value. An alarm is responsive to a signal from the voltage detection circuitry to deliver an alarm when the battery voltage drops below the preset voltage value so that even when the terminal voltage of the battery drops below the preset value due to a massive load increase, the alarm is still delivered. Check signal timing circuitry generates a timing signal during a predetermined short length of time in correspondence with a check signal. Finally, load resistance driving apparatus connects a predetermined load resistance across the terminals of the battery during the predetermined short length of time in accordance with the timing signal generated in the check signal timing circuitry. In this way, a small-size battery checker is mounted in the vehicle in which the length of time for applying a load current is minimized, the voltage across the terminals of the battery can always be monitored, and the size of the resistance is significantly reduced.

((Process for Determining Seat Driving based upon Battery Capacity Detection))

The operation of the overall system will be described in more detail with reference to a flow chart shown in FIGS. 6A to 6C. When power is supplied to the control circuit member 41, initialization is performed in step S101. Power is supplied to the control circuit member 41 when the door lock is released for entry to the vehicle and the door is opened so as to turn on the relay 42, when the ignition switch is turned OFF for leaving the vehicle and the door is opened so as to turn on the relay 42, and when the ignition switch 22 is closed. Thus, in step S102, the flag is fetched so as to determine what cause enabled the controlling circuit member 41, i.e., which component the controlling circuit member 41 should control.

If it is determiend in step S103 that the entry flag is set, the entry mode control is performed in step S104 and thereafter. In step S104, a value of a sensor for detecting the specific gravity of the electrolytic solution of the battery is fetched. In step S105, the battery capacity is measured to see if it exceeds a predetermined value. If YES in step S105, i.e., if the battery capacity exceeds a predetermined value and the engine can normally start if the seat 5 and the like are moved and power is consumed, the operation sequence for the entry mode is performed in step S107 and thereafter. However, if NO in step S105, the device stands by in step S106 until the engine is started. When the engine is started, the seat and the equipment are moved to target positions corresponding to the key signal in step S111 and thereafter.

The operation when the battery capacity exceeds a predetermined value will be described with reference to step S107 and thereafter. In order to allow easy entry into the vehicle in step S107, the relays 44 are cotnrolled so that a seat slide motor is made conductive to move the seat 5 backward. Thus, the motor is rotated and the seat 5 is moved backward. The limit switch 505 for detecting the seat slide limit position is mounted on the base 508 fixed on the vehicle body. In step S107, the state of the limit switch 505 is monitored. When it is detected that the actuating plate 506 pushes the switch 55 so as to turn it ON, the relays 44 are controlled so that the motor is turned OFF.

In step S108, the relays 44 are controlled so that a seat rotating motor is rendered conductive to rotate the seat toward the door side, i.e., in a clockwise direction. The limit switch 502 is provided for detecting the clockwise rotation limit (right-full) position of the seat 5. In step S108, the state of the limit switch 502 is monitored. When it is detected that the actuating plate 503 actuates the limit switch 502 so as to turn it ON, the relays 44 are controlled to turn OFF the motor.

The limit switch 504 is provided for detecting that the driver is seated in the seat. In step S109, the state of the switch 504 is monitored. When it is detected that the actuating plate 511 actuates the switch 504 so as to turn it ON, the flow advances to step S110. In step S110, the relays 44 are controlled so that the seat rotating motor is rendered conductive to rotate the seat 5 counterclockwise, i.e., the motor is rotated and, accordingly, the seat 5 is rotated, counterclockwise.

The limit switch 501 is provided for detecting that the seat 5 faces forward. In step S110, the state of the limit switch 501 is monitored. When it is detected that the actuating plate 503 actuates the switch 501 so as to turn it ON, the relays 44 are controlled to turn OFF the motor. The above operations are performed in order to allow easy entry into the vehicle.

In the next step and thereafter, control for automatically moving the seat and the like to preset positions is performed. Referring to FIGS. 3A and 3B, reference numeral 47 denotes the key signal holding portion which sets and holds the signal from the key sensor 24 when the door lock is released. The key sensor signal is held until the door lock is released by a different type of key. In step S111, the key signal from the holding portion 47 is fetched.

In step S112, stored position data is read out from storing portions corresponding to keys A, B, and C, and the readout data is compared with the current positions of the respective actuators. Thus, the conductive directions of the motors are determined, and the relays 44 are controlled in accordance therewith. The stored positions include: (1) the seat: (a) the forward/backward slide position, (b) the upper/lower position of the front edge, and (c) the upper/lower position of the rear edge; (2) the room mirror: (a) the right/left position and (b) the upper/lower position; (3) left fender mirror: (a) the right/left position and (b) the upper/lower position; and (4) the right fender mirror: (a) the right/left position and (b) the upper/lower position.

When the stored position coincides with the current position, the relays 44 are controlled to turn OFF the corresponding motor. When automatic movement to the stored positions for all the motors is completed, the entry flag in the relay controlling portion 43 is reset in step S113, and the relay 42 is turned OFF in step S114. Since the power transmission path to the controlling circuit member 41 is interrupted, the controlling circuit member 41 stops operation. Control for the entry mode is performed as described above.

Control for the leaving mode will be described hereinafter. If it is detected in step S115 that the leaving flag is set, control for the leaving mode is performed. In step S116, the current positions of the respective actuators are stored in the storing portion corresponding to the type of key in use. Control for allowing easy leaving from the vehicle is then performed. This control is performed in substantially the same manner as in the entry mode.

In step S117, the seat is moved backward until the limit switch at the limit position is turned ON. In step S118, the seat is rotated clockwise until the limit switch 502 at the clockwise limit (right-full) position is turned ON. In step S119, the state of the switch 504 is monitored. When it is detected that the switch 504 is turned OFF, the flow advances to step S120.

In step S120, the seat is rotated counterclockwise until the front limit switch 501 is turned ON. When the seat faces forward, i.e., is positioned at the original position, the leaving flag in the relay controlling portion 43 is reset in step S121, and the relay 42 is turned OFF in step S122. Thus, the controlling circuit member 41 is turned OFF. The operation for the leaving mode is performed as described above.

The operation for manually adjusting the seat and the like to optimum positions for the driver using the manual operating switches will be described hereinafter. The manual operation is enabled only when the ignition switch 22 is kept ON. If it is detected in step S123 that the switch 22 is turned ON, the signal from the manual operating switches 27 is fetched in step S124.

If it is detected in step S125 that any of the switches 27 is turned ON, the motor corresponding to the switching operation and its conductive direction are determined. In step S126, the relays 44 are controlled to turn ON the corresponding motor. In step S127, the signal from the switches 27 is fetched again. In step S128, it is checked if the signal fetched in step S127 coincides with that fetched in step S124. As long as the same switch is operated, steps S127 and S128 are repeated and the motor is continuously rotated. When the corresponding switch is turned OFF, the flow advances to step S129, and the relays 44 are controlled to turn OFF the corresponding motor. The flow then returns to step S102, and the device stands by until the next manual operating switch is operated. When none of the switches 27 is operated, the controlling circuit member 41 waits for switching input in the order of steps S102, S103, S115, S123, S124, S125, and S102.

Figure 6B:
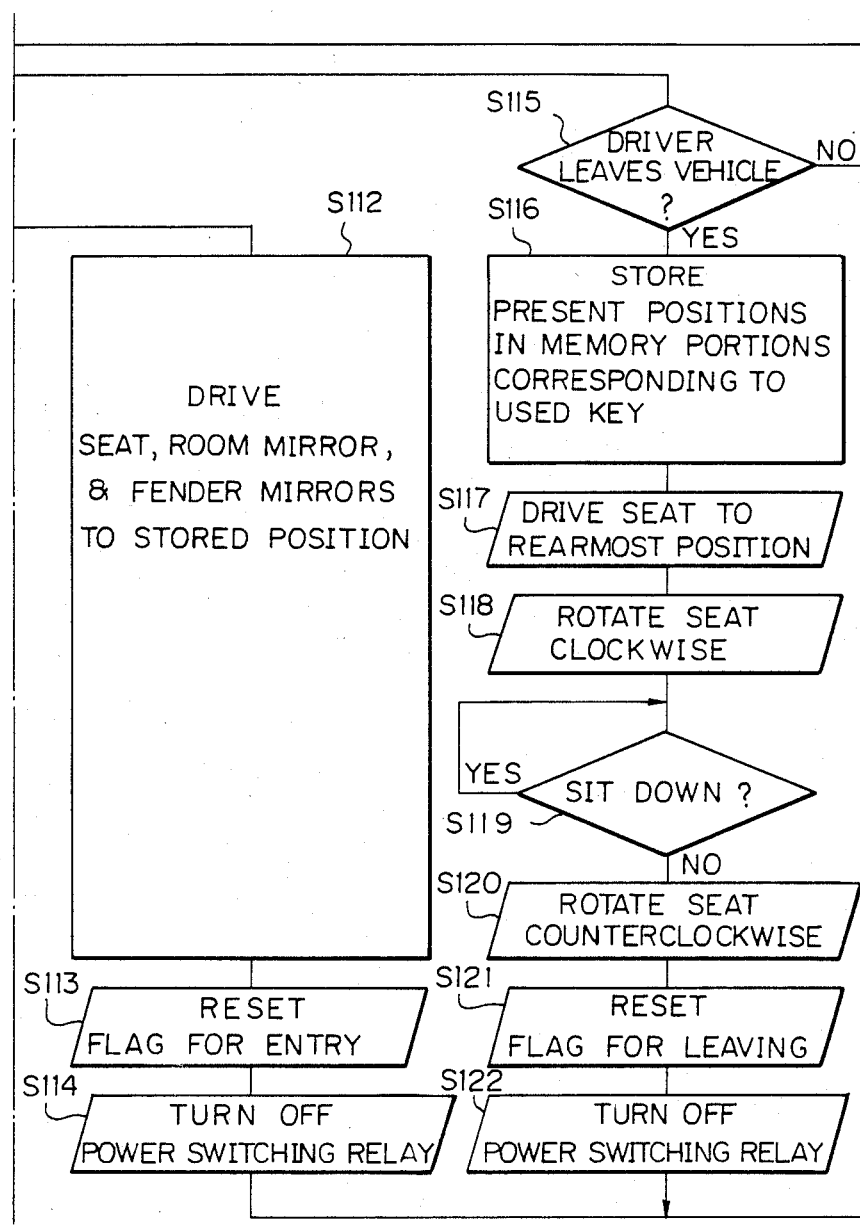
Figure 6C:
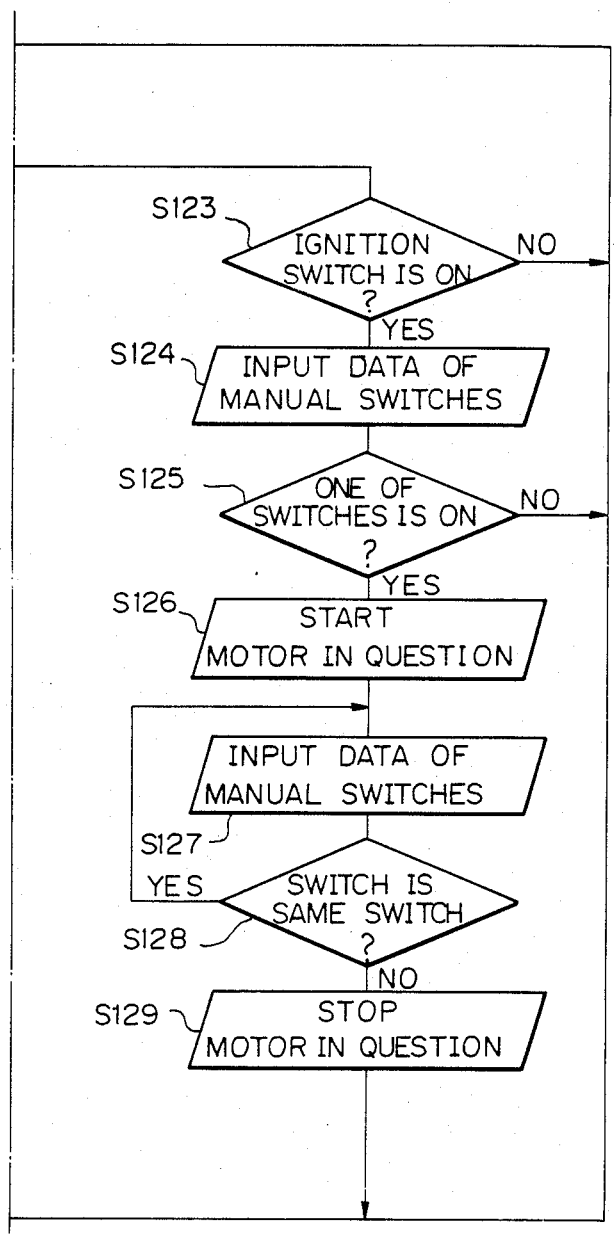
Figure 7B:
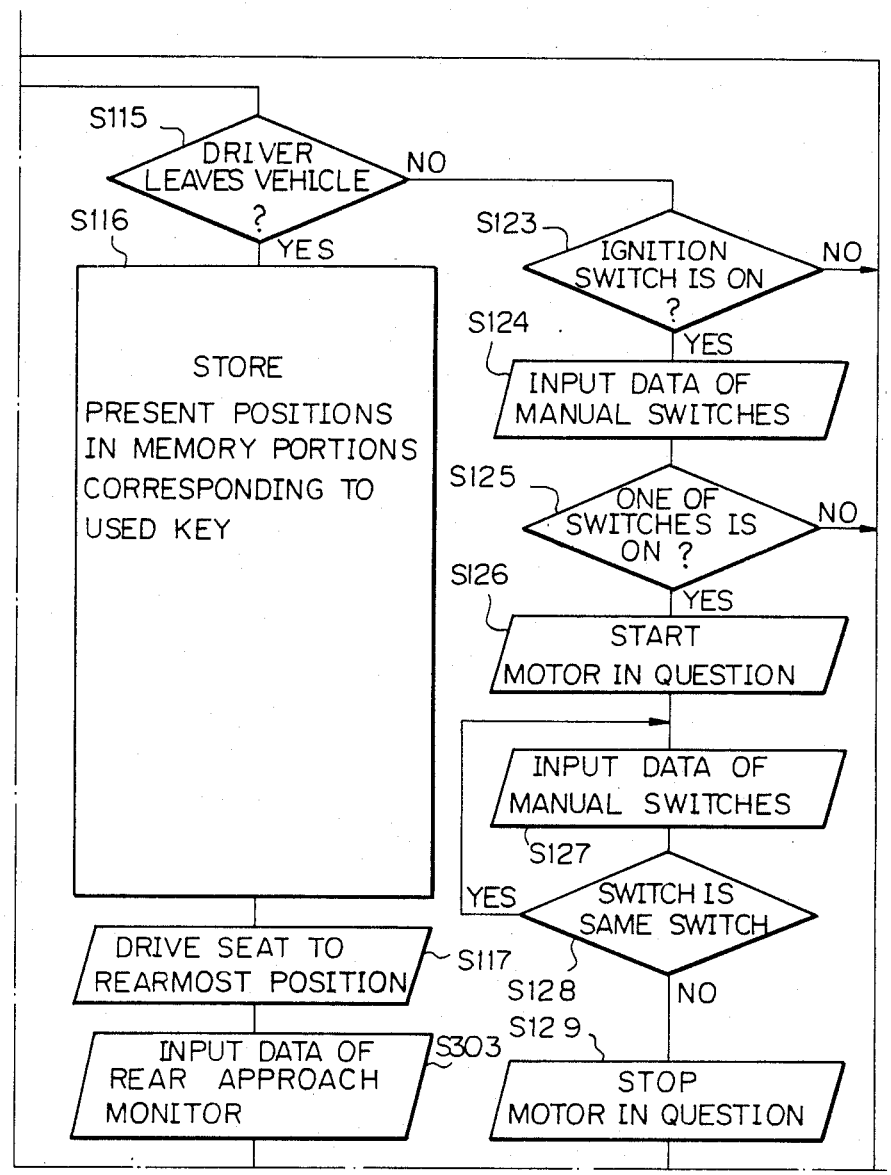
Figure 7C:
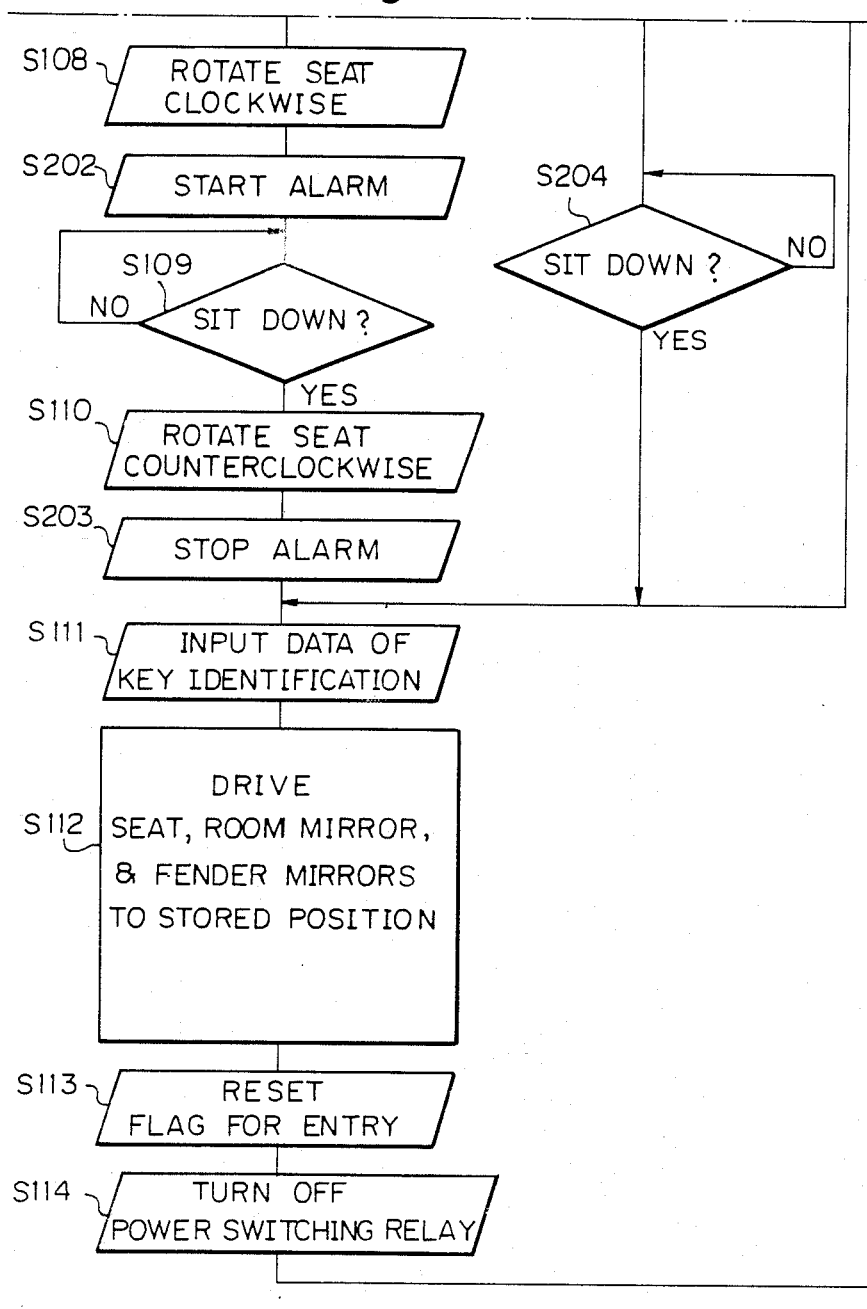
Figure 7D:
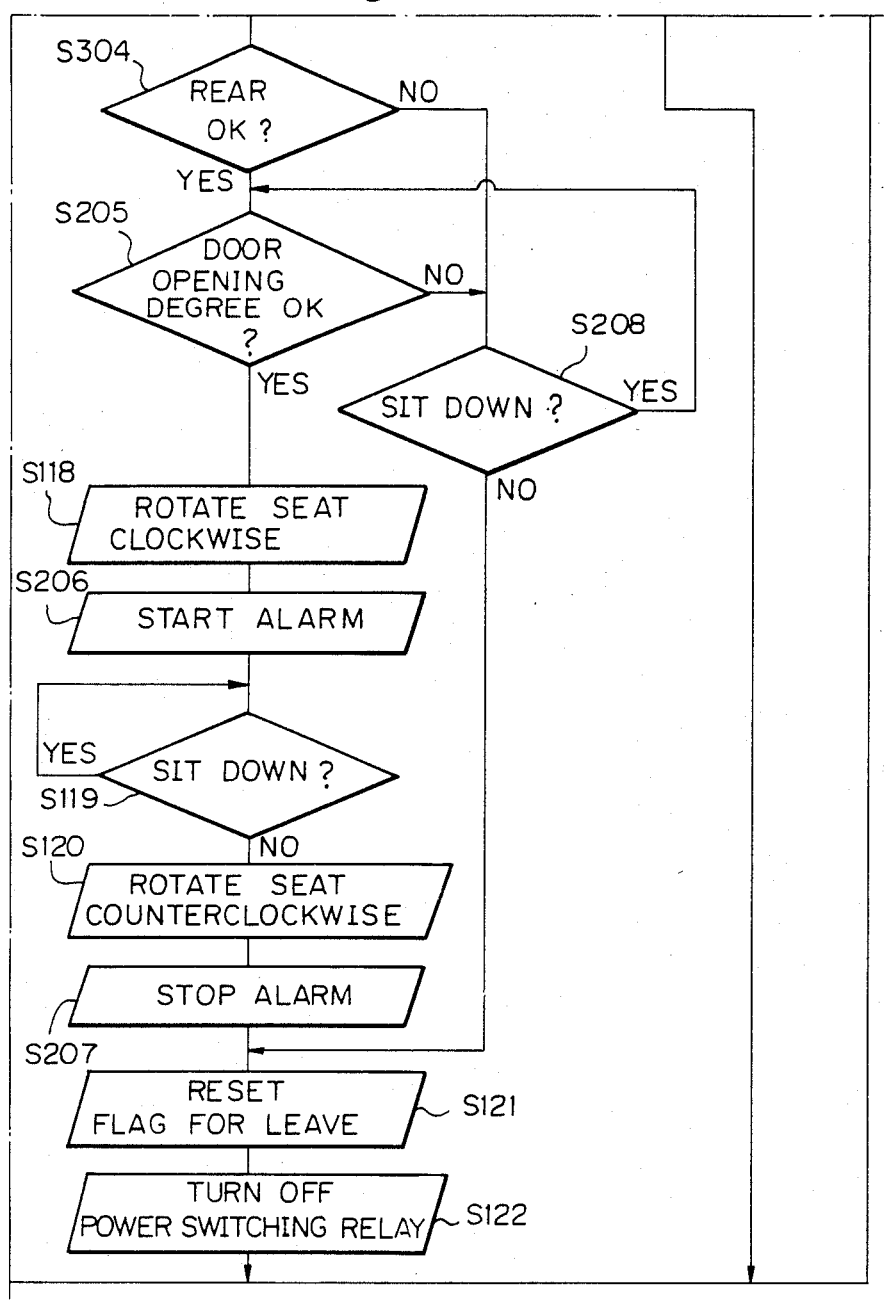

In the flow chart shown in FIGS. 6A to 6C, the battery capacity is checked. When the battery capacity is lower than the predetermined value, the engine is first started, and the driving operation of the seat and the equipment is inhibited until the generator begins generating power. Thus, the battery capacity cannot be further lowered. Therefore, an adverse influence to the engine starting capacity (e.g., inability to start the engine) due to operation of an automatic setting apparatus for a driver's seat and equipment can be prevented.

((Process of Door Opening Degree Monitoring Routine))

A process of a door opening degree monitoring routine will be described with reference to a flow chart shown in FIGS. 7A to 7D. It is checked in step S201 whether or not the door opening degree is sufficient for rotating the seat. If NO in step S201, i.e., if the door opening degree is insufficient, the flow advances to step S204. When the driver is not seated in the seat, the seating state of the driver is continuously checked in step S204. When the driver is seated in the seat, subsequent automatic movement of the equipment is performed in step S111 and thereafter. However, if YES in step S201, the relays 44 are controlled in step S108 so that the seat rotating motor is rendered conductive to rotate the seat to the door side. Thus, the motor is rotated, and the seat is rotated clockwise.

The limit switch 502 is provided for detecting the clockwise rotation limit (right-full) position. In step S108, the state of the limit switch 502 is monitored.

When it is detected that the actuating plate 503 actuates the limit switch 502 so as to turn it ON, the relays 44 are controlled to turn OFF the motor. When clockwise rotation of the seat is completed, the alarm device 65 is driven in step S202, thus generating an alarm sound.

The limit switch 504 for detecting that the driver is seated in the seat 5 is mounted on the seat 5. In step S109, the state of the switch 504 is monitored. When it is detected that the actuating plate 511 actuates the switch 504 so as to turn it ON, the flow advances to step S110. In step S110, the relays 44 are controlled so that the seat rotating motor is made conductive to rotate the seat counterclockwise. Thus, the motor is rotated, and the seat is rotated counterclockwise.

The limit switch 501 is provided for detecting that the seat 5 faces forward. In step S110, the state of the limit switch 501 is monitored. When it is detected that the actuating plate 503 actuates the switch 501 so as to turn it ON, the relays 44 are controlled to turn OFF the motor. If the seat faces forward in this manner, the alarm sound is stopped in step S203. The above operation is performed to allow easy leaving from the vehicle.

In step S205, it is checked whether or not the current door opening degree is sufficient for rotating the seat. If NO in step S205, i.e., the door opening degree is insufficient, the flow advances to step S208. When the driver remains in the seat, the flow returns to step S205 so as to continuously check the door opening degree and leaving of the driver. When the driver leaves the seat, the processing in step S121 and thereafter is performed. However, if YES in step S205, the seat is rotated clockwise until the limit switch 502 is turned ON in step S118. After completing clockwise rotation of the seat, the alarm device 65 is driven in step S206, thus generating an alarm sound.

In step S119, the state of the switch 504 is monitored. When it is detected that the switch 504 is turned OFF, the flow advances to step S120. In step S120, the seat is rotated counterclockwise until the front limit switch 501 is turned ON. When the seat faces forward, i.e., is returned to the original position, the alarm sound is stopped in step S207.

According to the process described above, the door opening degree is detected by the door opening degree sensor when the seat is rotated to the door side. After confirming that the seat will not abut against the door, the seat is rotated. Thus, the seat cannot abut against the door. When the seat is rotated clockwise, i.e., to the door side, since the alarm sound is generated, careless operation by the driver, i.e., closing the door when the seat is located at the clockwise limit position and the seat abuts against the door, can be avoided.

In the above embodiment, the alarm sound is generated when the seat is rotated to the door side. However, as a modification, to decrease a generation frequency of the alarm sound, the alarm sound can be generated, for example, only when the door is closed while the seat is located at the clockwise limit position. More specifically, when the seat is located at the door side in steps S108 to S110 and steps S118 to S120, the signal from the door opening degree sensor can be checked. At this time, the alarm sound can be generated only when the signal indicates that the door is being closed.

((Process of Door Opening Degree Monitoring and Rear Approach Monitoring Routines))

To prevent dangerous accidents when another vehicle passes by on the driver's side of the vehicle from the rear side, the rear monitoring device 28 is operated in step S301 and checks in step S302 whether or not another vehicle is approaching from the rear side. If YES in step S302, step S204 is executed, and the device stands by until the driver is seated in the seat while the seat remains at its rearmost position. When the driver is seated in the seat, step S111 and thereafter are executed. However, if NO in step S302, in order to rotate the seat clockwise to allow easy entry, step S201 and thereafter are executed. In step S108, the relays 44 are controlled so that the seat rotating motor is rendered conductive to rotate the seat to the door side (clockwise). Thus, the motor is rotated and the seat is rotated clockwise.

After step S117, in order to prevent an accident when another vehicle passes by on the driver's side of the vehicle from the rear side, the rear monitoring device 28 is operated in step S303, and checks in step S304 whether or not another vehicle is approaching from the rear side.

If YES in step S304, step S208 is executed, and the device stands by until the driver is seated in the seat while the seat remains at its rearmost position. When the driver is seated in the seat, step S121 and thereafter are executed. If NO in step S304, to rotate the seat clockwise and allow easy entry, step S205 and thereafter are executed. In step S118, the relays 44 are controlled so that the seat rotating motor is rendered conductive to rotate the seat to the door side (clockwise). Thus, the seat is rotated clockwise until the right-full limit switch 502 is turned ON.

In step S119, the state of the switch 504 is also monitored. If it is detected that the switch 504 is turned OFF, the flow advances to step S120. In step S120, the seat is rotated counterclockwise until the front limit switch 501 is turned ON.

Note that, in the above embodiment, the rear monitoring device checks a vehicle approaching from the rear side only before the seat is rotated to the door side, and if such a vehicle approach is detected, inhibits rotation of the seat. However, as a modification, in order to assure further safety, when the seat is rotated from the normal front position to the door side, the backward monitoring device is continuously operated so as to monitor a vehicle approaching from rear side, and if such a vehicle approach is detected, quickly inhibits rotation of the seat so as to return the seat to the front position.

More specifically, the rear monitoring device operated in steps S301 and S303 in the flow chart shown in FIGS. 6A to 6C is continuously operated until the seat is returned to the normal front position in steps S110 and S120. In steps S108 and S109 and steps S118 and S119, the detection signal of a vehicle approaching from the rear side from the backward monitoring device is continuously checked, and if such a vehicle approach is detected, steps S110 and S120 are immediately executed so as to rotate the seat counterclockwise to the front position. Thus, further safety can be provided as compared to the above embodiment.

To further enhance safety, immediately after the driver leaves the seat when the seat is rotated clockwise in the leaving mode, the seat is rotated counterclockwise so as to return it to the front position. More specifically, when the seat is rotated clockwise in step S118 in the flow chart of FIGS. 6A to 6C, it is simultaneously checked in step S119 if the driver is seated in the seat. When the seat is rotated to the clockwise limit position, if the switch 504 detects that the driver leaves the seat before the limit switch 502 is turned on, step S120 is executed so as to rotate the seat counterclockwise to the front position. Thus, the safety of the driver in the leaving mode can be further assured and the operation time can be reduced.

Note that, in the above embodiment, the seat is moved backward and rotated clockwise to allow easy entry to and alighting from the vehicle. In addition, the seat can be slid toward the door side.

We claim:

1. A drive control device for a seat in a vehicle commprising:
   entry detection means for detecting an entry of a driver into said vehicle;
   battery capacity detection means for detecting a capacity of an electric power source battery in said vehicle;
   engine start detection means for detecting a start of an engine of said vehicle;
   seat drive means for causing movement of said seat;
   controlling circuit means for receiving signals from said entry detection means, said battery capacity detection means and said engine start detection means and delivering a drive control signal to said seat drive means, and for deciding whether the capacity of said battery is lower than a predetermined reference value when an entry is detected by said entry detection means, and for prohibiting said movement of said seat when the decision of said battery capacity decision function is affirmative and the detection of said engine start detection means is negative, and for enabling movement of said seat when the decision of said battery capacity decision function is negative.

2. A drive control device for a driver's seat in a vehicle comprising:
   entry detection means for detecting an entry of a driver into said vehicle;
   battery capacity detection means for detecting a capacity of an electric power source battery in said vehicle;
   engine start detection means for detecting a start of rotation of an engine in said vehicle;
   first decision means for deciding whether the battery capacity detected by said battery capacity detection means is lower than a predetermined capacity when an entry of a driver is detected by said entry detection means;
   first drive means for driving the seat to a predetermined first state when the decision of said first decision means is negative, said first state being a state suitable for the driver to sit down;
   second drive means for driving the seat to a preliminary stored second state after said first driving by said first driving means, said second state being a state suitable for the driver to drive the vehicle;
   second decision means for deciding whether the start of the rotation of the engine is detected by said engine start detection means when the decision of said first decision means is affirmative; and
   means for by-passing said first driving means and carrying out the driving by said second drive means when the decision of said second decision means is affirmative.

3. A device according to claim 2, further comprising sitting detection means for detecting, sitting down of said driver on said seat, said device further having means for driving said seat to restore an original state of said seat when said sitting detection means detects the driver's sitting down on said seat after said set is driven to said predetermined first state.

4. A device according to claim 3, further comprising door opening detection means for detecting an opening degree of a door of said vehicle, said device further having door-related seat driving prohibition means for prohibiting the driving of said seat to said predetermined first state when said door opening detection means detects the opening degree of the door to be less than a predetermined value.

5. A device according to claim 3, further comprising object approach monitoring means for monitoring an approach of an object to said vehicle, said device further having approach-related seat motion prohibition means for prohibiting the driving of said seat to said predetermined first state when said object approach monitoring means detects the approach of an object to said vehicle.

6. A device according to claim 2, wherein said second drive means includes means for driving said seat in a forward/backward direction.

7. A device according to claim 6, further comprising driver identifications means for identifying a driver of said vehicle, said preliminary storage of said second state of the seat being a preliminary storage of a second state for each of a plurality of drivers of said vehicle, said device further including means for controlling the driving said seat to the preliminary stored second state on the basis of the identification of a driver by said driver identification means.

8. A device according to claim 2, further comprising ignition detection means for detecting an OFF state of an ignition switch of said vehicle, and seat position detection means for detecting the position of a seat along the forward/backward direction, snad controlling means further including means for preliminary storing said second state of the seat for the identified driver by storing a position of the seat along the forward/backward direction detected by said seat position detection means when said ignition detection means detects a turning-off of the ignition switch.

9. A method for controlling a seat in a vehicle, comprising the steps of:
   detecting an entry of a driver into said vehicle;
   detecting a capacity of an electric power source battery in said vehicle;
   detecting a start of an engine of said vehicle;
   receiving, with a control circuit, signals depicting driver entry detection, battery capacity, and engine start;
   deciding whether the capacity of said battery is lower than a predetermined reference value when a driver entry is detected;
   prohibiting movement of said seat when the battery capacity is below said predetermined reference value and when said engine is detected as not having been started; and
   moving said seat when said battery capacity is above said predetermined reference value.

10. A method for controlling a driver's seat in a vehicle, comprising the steps of:

detecting an entry of a driver into said vehicle;

detecting a capacity of a battery in said vehicle;

detecting a start of rotation of an engine in said vehicle;

deciding whether or not the battery capacity is lower than a predetermined reference value when a driver entry has been detected;

driving the seat to a first position when the above deciding step is negative;

driving said seat to a preliminarily stored second position after said seat has been driven to said first position;

deciding whether or not the start of rotation of said engine has been detected when the decision in the previous decisions step is positive; and driving said seat to said second state when the decision of the second decision step is positive.

11. A method according to claim 10 including the further steps of:

detecting the driver sitting down on said seat;

driving said seat to an original position when the driver is detected as sitting down on said seat after the seat has been driven to said first position.

12. A method according to claim 11 further including the steps of:

detecting an opening degree of door of said vehicle; and prohibiting driving of said seat to said first position when the opening degree of the door is detected as being less than a predetermined value.

13. A method according to claim 11 further comprising the steps of:

monitoring an approach of an object to said vehicle; and prohibiting the driving of said seat to said first position when an object is detected as approaching said vehicle.

14. A method according to claim 10, wherein the step of driving said seat to said second position includes the step of driving said seat in a forward/backward direction.

15. A method according to claim 14, further including the steps of:

identifying a driver of said vehicle;

preliminarily storing said plurality of said second states;

responding to a plurality of potential drivers of said vehicles; and driving said seat to said second position based on the identification of the driver step.

16. A method according to claim 15, further including the steps of:

detecting an OFF state of an ignition switch of said vehicle;

detecting a position of said seat along the forward/backward direction; and preliminarily storing said plurality of said second positions for the plurality of drivers by storing a position of the seat along the forward/backward direction detected when the ignition is detected as being OFF.

* * * * *